United States Patent [19]

Ariyo

[11] Patent Number: 5,634,279
[45] Date of Patent: Jun. 3, 1997

[54] ORIENTATION APPARATUS FOR PLANAR-SURFACE-MOUNTED ITEMS

[76] Inventor: Olawumi Ariyo, 1945 Eastchester Rd. Apt. 28C, Bronx, N.Y. 10461-2189

[21] Appl. No.: 612,236

[22] Filed: Mar. 7, 1996

[51] Int. Cl.⁶ ........................................ B43L 7/10
[52] U.S. Cl. .................... 33/462; 33/500; 33/613
[58] Field of Search ................. 33/613, 645, 418, 33/419, 427, 452, 459, 462, 464, 497, 499, 500

[56] References Cited

U.S. PATENT DOCUMENTS

| | | | |
|---|---|---|---|
| 223,727 | 1/1880 | Halley | 33/419 |
| 847,720 | 3/1907 | Barbo | 33/462 |
| 1,205,687 | 11/1916 | Verhey et al. | 33/462 |
| 1,244,570 | 10/1917 | Woods | 33/462 |
| 1,601,138 | 9/1926 | Moore | 33/462 |
| 1,616,820 | 2/1927 | Owen | 33/462 |
| 1,622,158 | 3/1927 | Liberty | 33/462 |
| 2,515,622 | 7/1950 | Wild | 33/497 |
| 3,524,259 | 8/1970 | Handley . | |
| 3,851,868 | 12/1974 | Lagasse | 33/194 |
| 4,100,681 | 7/1978 | Hollander . | |
| 4,208,802 | 6/1980 | Berndt . | |
| 4,446,627 | 5/1984 | Perrson | 33/418 |
| 4,473,957 | 10/1984 | Faulkner . | |
| 4,944,094 | 7/1990 | Depiano et al. . | |
| 5,165,650 | 11/1992 | Letizia . | |
| 5,440,818 | 8/1995 | Mailhot | 33/452 |

Primary Examiner—Thomas B. Will

[57] ABSTRACT

An orientation apparatus for planar-surface-mounted items includes a base assembly and a first right triangle unit connected to a first end portion of the base assembly. A first pivot assembly pivotally connects the first right triangle unit to the first end portion of the base assembly. A first lock assembly locks the first right triangle unit at a selected orientation with respect to the base assembly. A second right triangle unit is connected to a second end portion of the base assembly. A second pivot assembly pivotally connects the second right triangle unit to the second end portion of the base assembly. A second lock assembly locks the second right triangle unit at a selected orientation with respect to the base assembly. The base assembly can include a first telescopic member connected to the first pivot assembly and a second telescopic member connected to the second pivot assembly. The first telescopic member includes a pair of peripheral first riser portions, and the first lock assembly includes a plurality of first lock bumps attached to the first right triangle unit for engaging the pair of the first riser portions of the first telescopic member. The second telescopic member includes a pair of peripheral second riser portions, and the second lock assembly includes a plurality of second lock bumps attached to the second right triangle unit for engaging the pair of the second riser portions of the second telescopic member.

2 Claims, 3 Drawing Sheets

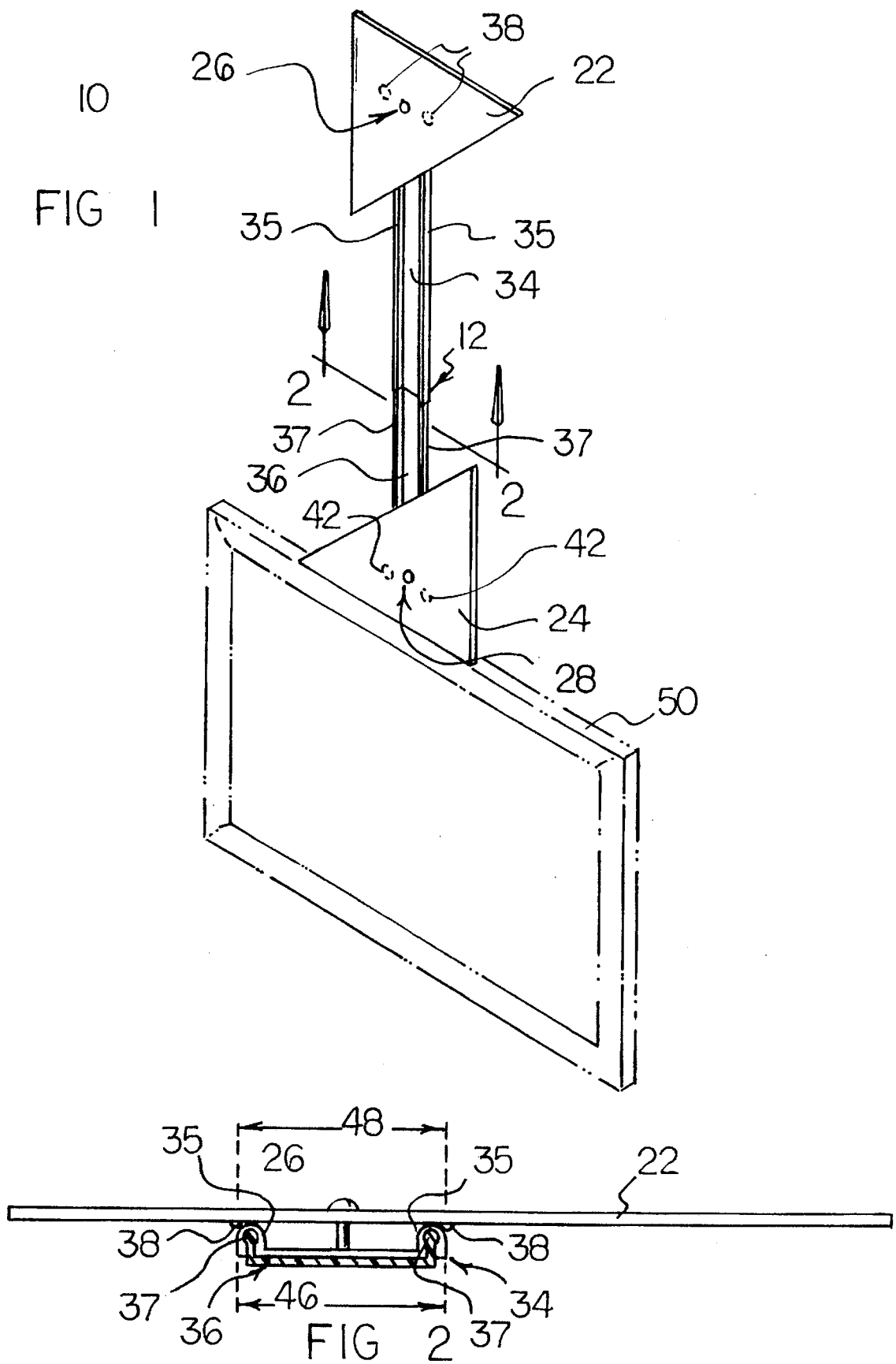

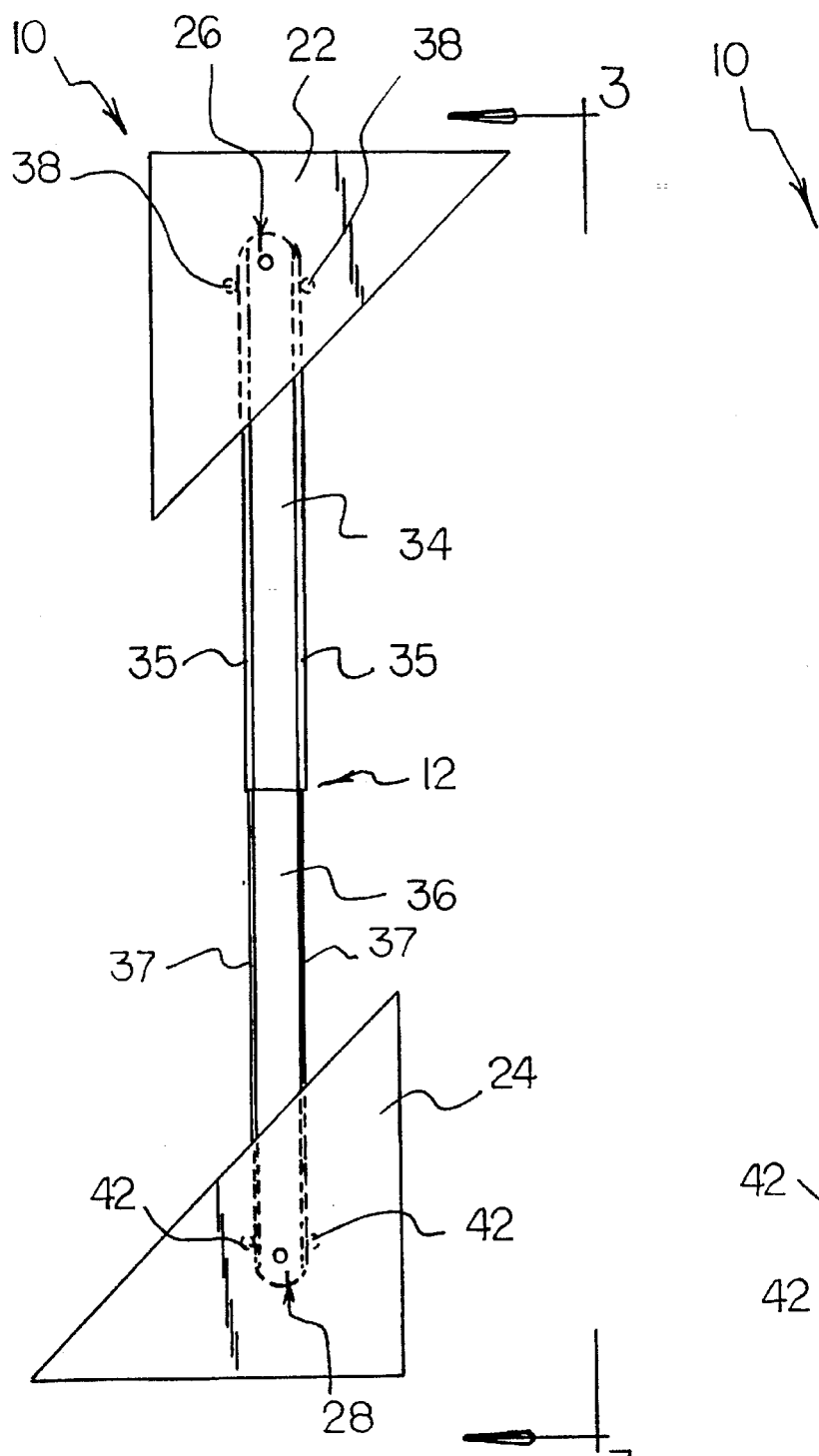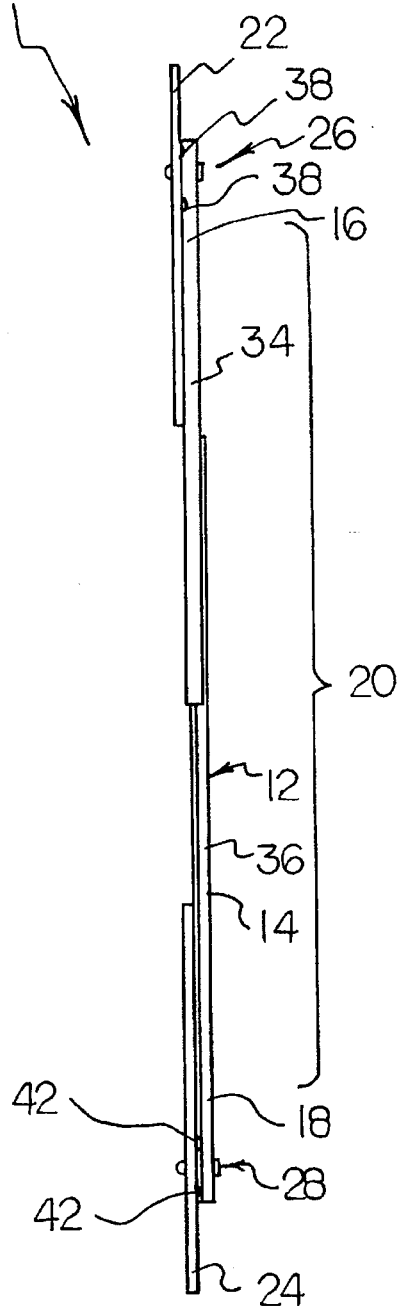
FIG 3
FIG 4

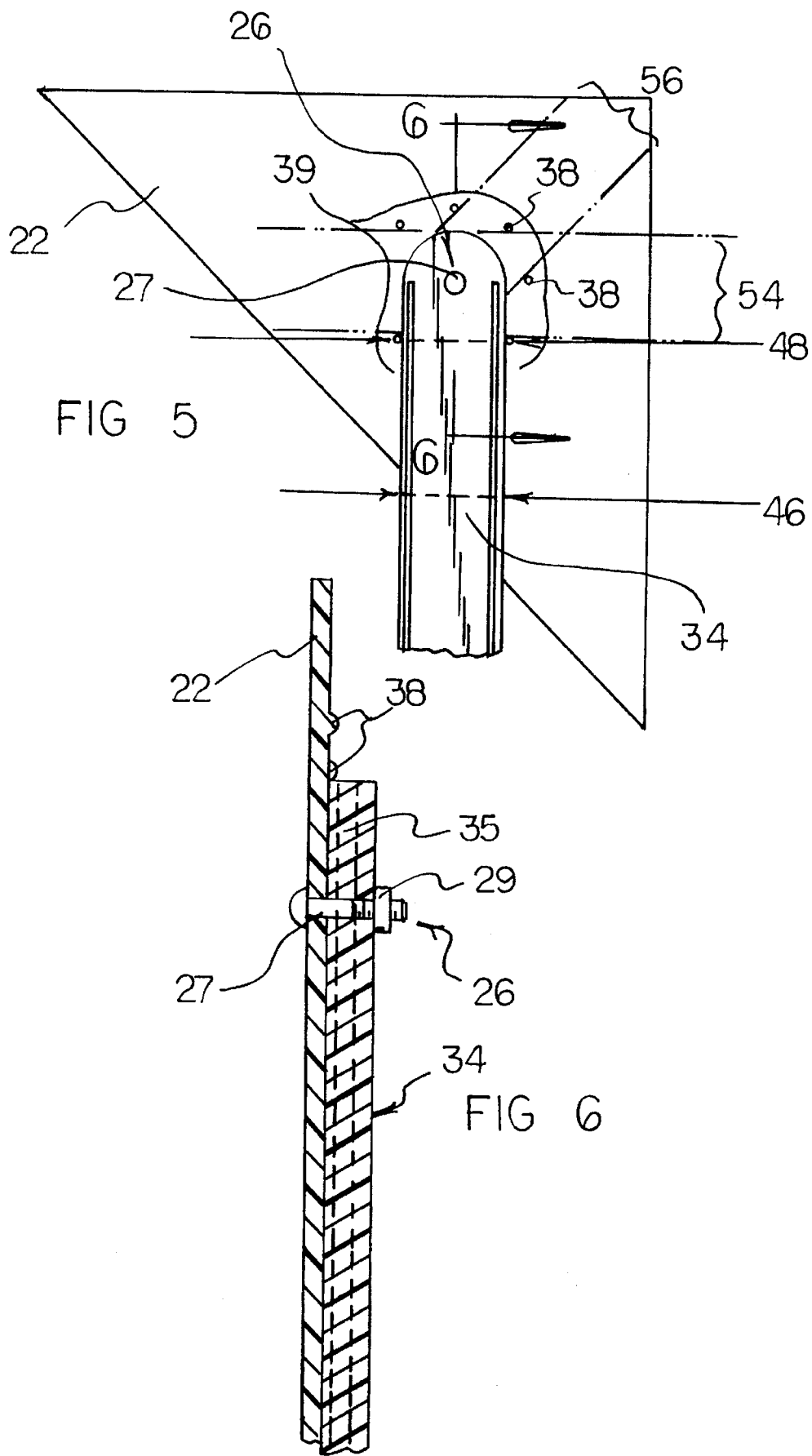

ORIENTATION APPARATUS FOR PLANAR-SURFACE-MOUNTED ITEMS

BACKGROUND OF THE INVENTION

1. Field of the Invention

The present invention relates generally to devices used to provide proper orientation of items and, more particularly, to devices used for properly orienting items on planar surfaces such as walls.

2. Description of the Prior Art

When a picture is to mounted on a wall, it is important that the picture is oriented properly. Generally, a picture is in a rectangular frame, and the frame is mounted on the wall so that the top edge of the frame is parallel to the ceiling. Similarly, the side edges of the picture frame are generally parallel to the walls.

Throughout the years, a number of innovations have been developed relating to properly orienting wall-mounted items, and the following U.S. patents are representative of some of those innovations: U.S. Pat. Nos. 3,524,259, 4,100,681, 4,208,802, 4,473,957, 4,944,094, and 5,165,650. It is noted that each of the above-cited patented devices share a common characteristic. They all employ a spirit level to aid in proper orientation. A number of disadvantages are associated with the use of a spirit level. If the enclosure for the liquid in the spirit level cracks, the liquid may leak out, and the effectiveness of the device may be destroyed. The spirit level permits a determination of a true horizontal. Yet, there may be times when it is not desired to orient a picture frame along a true horizontal. Moreover, a spirit level does not aid in effective vertical orientation of side edges of a picture frame. In view of the above, it would be desirable if a device were provided for orienting a wall-mounted item, such as a picture frame, which does not employ a spirit level.

Still other features would be desirable in an orientation apparatus for wall-mounted items. For example, it would be desirable if an orientation device permitted a wall-mounted item to be mounted parallel to a wall. Similarly, it would be desirable if an orientation device permitted a wall-mounted item to be mounted parallel to a ceiling.

Sometimes, a person may want to assure that a wall-mounted item is mounted parallel to a floor surface. Therefore, it would be desirable if an orientation device permitted a wall-mounted item to be mounted parallel to a floor surface.

Aside from orienting a wall-mounted item parallel to a ceiling, wall, or floor, there may be occasions when it would be desirable to orient a wall-mounted item at a predetermined orientation which is not parallel to the ceiling, wall, or floor. In this respect, it would be desirable if an orientation device for a wall-mounted item permitted a wall-mounted item to be oriented in a way that is not parallel to either the ceiling, the wall, or the floor.

Often when a wall-mounted item is oriented on a wall surface, the item is not in contact with either the ceiling, an intersecting wall, or the floor. Therefore, the item may be relatively unstable and may easily shift out from a desirable orientation. To avoid such instability, it would be desirable if the wall-mounted item could be in some sort of contact with either the ceiling, an intersecting wall, or the floor when the item is being oriented.

Thus, while the foregoing body of prior art indicates it to be well known to use orientation devices for orienting wall-mounted items, the prior art described above does not teach or suggest an orientation apparatus for wall-mounted items which has the following combination of desirable features: (1) does not employ a spirit level; (2) permits a wall-mounted item to be mounted parallel to an intersecting wall; (3) permits a wall-mounted item to be mounted parallel to a ceiling; (4) permits a wall-mounted item to be mounted parallel to a floor surface; (5) permits a wall-mounted item to be oriented in a way that is not parallel to either the ceiling, an intersecting wall, or the floor; and (6) permits a form of contact between the wall-mounted item and either the ceiling, an intersecting wall, or the floor when the item is being oriented. The foregoing desired characteristics are provided by the unique orientation apparatus for planar-surface-mounted items of the present invention as will be made apparent from the following description thereof. Other advantages of the present invention over the prior art also will be rendered evident.

SUMMARY OF THE INVENTION

To achieve the foregoing and other advantages, the present invention, briefly described, provides an orientation apparatus for planar-surface-mounted items that includes a base assembly which includes a planar bottom side, a first end portion, a second end portion, and an intermediate portion located between the first end portion and the second end portion. A first right triangle unit is connected to the first end portion of the base assembly. A first pivot assembly pivotally connects the first right triangle unit to the first end portion of the base assembly. A first lock assembly is connected between the first right triangle unit and the base assembly for locking the first right triangle unit at a selected orientation with respect to the base assembly. A second right triangle unit is connected to the second end portion of the base assembly. A second pivot assembly pivotally connects the second right triangle unit to the second end portion of the base assembly. A second lock assembly is connected between the second right triangle unit and the base assembly for locking the second right triangle unit at a selected orientation with respect to the base assembly.

The base assembly can include a first telescopic member connected to the first pivot assembly, and a second telescopic member connected to the second pivot assembly. The first telescopic member includes a pair of peripheral first riser portions, and the first lock assembly includes a plurality of first lock bumps attached to the first right triangle unit for engaging the pair of the first riser portions of the first telescopic member. The first telescopic member has a first width, and at least one pair of the first lock bumps are separated from each other by a first distance which is substantially equal to the first width. The first lock bumps are arrayed around the first pivot assembly in a circular array. The second telescopic member includes a pair of peripheral second riser portions, and the second lock assembly includes a plurality of second lock bumps attached to the second right triangle unit for engaging the pair of the second riser portions of the second telescopic member.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved orientation apparatus for planar-surface-mounted items which has all of the advantages of the prior art and none of the disadvantages.

It is another object of the present invention to provide a new and improved orientation apparatus for planar-surface-mounted items which may be easily and efficiently manufactured and marketed.

It is a further object of the present invention to provide a new and improved orientation apparatus for planar-surface-mounted items which is of durable and reliable construction.

An even further object of the present invention is to provide a new and improved orientation apparatus for planar-surface-mounted items which is susceptible of a low cost of manufacture with regard to both materials and labor, and which accordingly is then susceptible of low prices of sale to the consuming public, thereby making such orientation apparatus for planar-surface-mounted items available to the buying public.

Still yet a further object of the present invention is to provide a new and improved orientation apparatus for planar-surface-mounted items which does not employ a spirit level.

Still another object of the present invention is to provide a new and improved orientation apparatus for planar-surface-mounted items that permits a wall-mounted item to be mounted parallel to an intersecting wall.

Yet another object of the present invention is to provide a new and improved orientation apparatus for planar-surface-mounted items which permits a wall-mounted item to be mounted parallel to a ceiling.

Even another object of the present invention is to provide a new and improved orientation apparatus for planar-surface-mounted items that permits a wall-mounted item to be mounted parallel to a floor surface.

Still a further object of the present invention is to provide a new and improved orientation apparatus for planar-surface-mounted items which permits a wall-mounted item to be oriented in a way that is not parallel to either the ceiling, an intersecting wall, or the floor.

Yet another object of the present invention is to provide a new and improved orientation apparatus for planar-surface-mounted items that permits a form of contact between a wall-mounted item and either the ceiling, an intersecting wall, or the floor when the item is being oriented.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the orientation apparatus for planar-surface-mounted items of the invention used on a wall for orienting a picture frame.

FIG. 2 is an enlarged cross-sectional view of the embodiment of the orientation apparatus shown in FIG. 1 taken along line 2—2 of FIG. 1.

FIG. 3 is an enlarged front view of the embodiment of the orientation apparatus of FIG. 1.

FIG. 4 is a side view of the embodiment of the invention shown in FIG. 3 taken along line 4—4 thereof.

FIG. 5 is an enlarged rear view of the top portion of the embodiment of the invention shown in FIG. 4.

FIG. 6 is a partial cross-sectional view of the top portion of the embodiment of the invention shown in FIG. 5 taken along line 6—6 thereof.

DESCRIPTION OF THE PREFERRED EMBODIMENT

With reference to the drawings, a new and improved orientation apparatus for planar-surface-mounted items embodying the principles and concepts of the present invention will be described.

Turning to FIGS. 1–6, there is shown an exemplary embodiment of the orientation apparatus for planar-surface-mounted items of the invention generally designated by reference numeral 10. In its preferred form, orientation apparatus for planar-surface-mounted items 10 includes a base assembly 12 which includes a planar bottom side 14, a first end portion 16, a second end portion 18, and an intermediate portion 20 located between the first end portion 16 and the second end portion 18. A first fight triangle unit 22 is connected to the first end portion 16 of the base assembly 12. A first pivot assembly 26 pivotally connects the first right triangle unit 22 to the first end portion 16 of the base assembly 12. A first lock assembly is connected between the first right triangle unit 22 and the base assembly 12 for locking the first right triangle unit 22 at a selected orientation with respect to the base assembly 12. A second right triangle unit 24 is connected to the second end portion 18 of the base assembly 12. The triangle units each have a first edge, a second edge intersecting the first edge at a right angle, and a third edge intersecting both the first and second edges. A second pivot assembly 28 pivotally connects the second right triangle unit 24 to the second end portion 18 of the base assembly 12. A second lock assembly is connected between the second right triangle unit 24 and the base assembly 12 for locking the second right triangle unit 24 at a selected orientation with respect to the base assembly 12.

The base assembly 12 can include a first telescopic member 34 connected to the first pivot assembly 26, and a second telescopic member 36 connected to the second pivot assembly 28.

As shown in FIG. 6, the first pivot assembly 26 can include a first pivot bolt 27 and a first nut 29 connected to the first pivot bolt 27. The shank of the first pivot bolt 27 passes through apertures in the first right triangle unit 22 and the first telescopic member 34 which are placed in registration. Similarly, the second pivot assembly 28 includes a second pivot bolt and a second nut connected to the second pivot bolt. The shank of the second pivot bolt passes through apertures in the second right triangle unit 24 and the second telescopic member 36 which are placed in registration.

The first telescopic member 34 includes a pair of peripheral first riser portions 35, and the first lock assembly includes a plurality of first lock bumps 38 attached to the first right triangle unit 22 for engaging the pair of the first riser portions 35 of the first telescopic member 34. The first telescopic member 34 has a first width 46, and at least one pair of the first lock bumps 38 are separated from each other by a first distance 48 which is substantially equal to the first width 46. The first lock bumps 38 are arrayed around the first pivot assembly 26 in a circular array 39.

The second telescopic member 36 includes a pair of peripheral second riser portions 37, and the second lock assembly includes a plurality of second lock bumps 42 attached to the second right triangle unit 24 for engaging the pair of the second riser portions 37 of the second telescopic member 36. The second lock bumps 42 are arrayed around the second pivot assembly 28 in a circular array. The second telescopic member 36 has a second width. At least a pair of the second lock bumps 42 are separated from each other by a second distance which is substantially equal to the second width. As shown in FIGS. 2 through 6, the first riser portions 35 are each shaped as an elongated channel (not labeled) spaced from one another and each having a hollow interior. The second riser portions 37 are each shaped as an elongated projection (not labeled) spaced from one another which extend into one of the elongated channels of the first riser portion to slidably couple the first telescopic member to the second telescopic member. The riser portions 35 and 37 of the respective telescopic member 32 and 34 thus position a main body portion (not labeled) of the telescopic members in a spaced position from the respective triangle units 22 and 24.

The first pivot assembly 26 can be located at a number of locations on the first right triangle unit 22. Similarly, the second pivot assembly 28 can be located at a number of locations on the second right triangle unit 24. Preferably, the first pivot assembly 26 and the second pivot assembly 28 are located at the centroids of the respective right triangles. A centroid is the point of intersection of medians of a triangle. A median is a line segment drawn from a vertex of the triangle to the midpoint of the opposite side. A centroid is a center of area or center of gravity for each right triangle unit.

The orientation apparatus 10 of the invention can be used in a number of ways. For example, as shown in FIG. 1, one edge of the second right triangle unit 24 is placed against a top of a rectangular picture frame 50 which is placed against a vertical wall surface. The orientation apparatus 10 is placed against the same vertical wall surface. The first telescopic member 34 and the second telescopic member 36 are moved with respect to each other to adjust the distance between the top edge of the first right triangle unit 22 and the bottom edge of the second right triangle unit 24. The top edge of the first right triangle unit 22 can be placed against the ceiling which intersects the vertical wall surface. As seen in FIG. 1, the top edge of the first right triangle unit 22 is parallel to the bottom edge of the second right triangle unit 24. By using the orientation apparatus 10 of the invention in this way, the picture frame 50 is oriented parallel to the ceiling.

Alternatively, the top edge of the first right triangle unit 22 can be placed against an intersecting vertical wall surface, and the bottom edge of the second right triangle unit 24 can be placed against a side of the picture frame 50. Still, alternatively, the top edge of the first right triangle unit 22 can be placed against a floor surface, and the bottom edge of the second right triangle unit 24 can be placed against the bottom of the picture frame 50. In this way, the orientation apparatus 10 of the invention is placed between the picture frame 50 and the floor surface. Also, in this way, the orientation apparatus 10 of the invention can partially support the picture frame 50. In each way of using the orientation apparatus 10 of the invention, the first telescopic member 34 can be moved relative to the second telescopic member 36 to obtain a desired distance between the top edge of the first right triangle unit 22 and the bottom edge of the second right triangle unit 24.

More generally, the orientation apparatus 10 of the invention can be used on other planar surfaces for orienting other planar-surface-mounted items. The planar surfaces can be vertical, horizontal, or sloped.

Each of the first right triangle unit 22 and the second right triangle unit 24 can be oriented in a variety of orientations with respect to each other and the base assembly 12. The first right triangle unit 22 is rotated around the first pivot assembly 26, and the second right triangle unit 24 is rotated around the second pivot assembly 28. As shown in FIG. 5, the first right triangle unit 22 is locked into a desired orientation with respect to the first telescopic member 34 by a pair of the first lock bumps 38 engaging the first riser portions 35 of the first telescopic member 34. Also shown in FIG. 5, alternative orientations 54 and 56 of the first right triangle unit 22 with respect to the first telescopic member 34 are shown. Similarly, the second right triangle unit 24 is locked into a desired orientation with respect to the second telescopic member 36 by a pair of the second lock bumps 42 engaging the second riser portions 37 of the second telescopic member 36. Similar alternative orientations of the second right triangle unit 24 with respect to the second telescopic member 36 can be obtained.

The components of the orientation apparatus for planar-surface-mounted items of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved orientation apparatus for planar-surface-mounted items that is low in cost, relatively simple in design and operation, and which may advantageously be used without employing a spirit level. With the invention, an orientation apparatus for planar-surface-mounted items is provided which permits a wall-mounted item to be mounted parallel to an intersecting wall. With the invention, an orientation apparatus for planar-surface-mounted items is provided which permits a wall-mounted item to be mounted parallel to a ceiling. With the invention, an orientation apparatus for planar-surface-mounted items is provided which permits a wall-mounted item to be mounted parallel to a floor surface. With the invention, an orientation apparatus for planar-surface-mounted items is provided which permits a wall-mounted item to be oriented in a way that is not parallel to either the ceiling, an intersecting wall, or the floor. With the invention, an orientation apparatus for planarsurface-mounted items is provided which permits a form of contact between the wall-mounted item and either the ceiling, an intersecting wall, or the floor when the item is being oriented.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An orientation apparatus for planar-surface-mounted items, said apparatus comprising:

a first telescopic member including a first main body portion and a pair of peripheral first riser portions, said first riser portions having exterior sides spaced apart a first width;

a second telescopic member including a second main body portion and a pair of peripheral second riser portions, said second riser portions having exterior sides spaced apart a second width, the second riser portions being slidably received within the first riser portions to slidably couple the first telescopic member to the second telescopic member;

a first right triangle unit having a first edge, a second edge intersecting said first edge of said first right triangle unit at a right angle, and a third edge intersecting both the first and second edges of said first right triangle unit, said first right triangle unit being rotatably connected to said first telescopic member at a centroid of said first right triangle unit, said peripheral first riser portions of said first telescopic member being positioned against an interior face of said first right triangle unit such that said first main body portion of said first telescopic member is spaced from said interior face of said first right triangle unit;

a second right triangle unit having a first edge, a second edge intersecting said first edge of said second right triangle unit at a right angle, and a third edge intersecting both the first and second edges of said second right triangle unit, said second right triangle unit being rotatably connected to said second telescopic member at a centroid of said second right triangle unit, said peripheral second riser portions of said second telescopic member being positioned against an interior face of said second right triangle unit such that said second main body portion of said second telescopic member is spaced from said interior face of said second right triangle unit;

a plurality of first lock bumps attached to said interior face of said first right triangle unit, with adjacent said first lock bumps being spaced apart said first width for engaging said exterior sides of said first riser portions of said first telescopic member;

a plurality of second lock bumps attached to said interior face of said second right triangle unit, with adjacent said second lock bumps being spaced apart said second width for engaging said exterior sides of said second riser portions of said second telescopic member.

2. The apparatus of claim 1 wherein said first lock bumps are arrayed around said first pivot assembly in a circular array.

* * * * *